United States Patent [19]

Miyano

[11] Patent Number: 4,704,511
[45] Date of Patent: Nov. 3, 1987

[54] TRAVELING-WIRE ELECTROEROSION MACHINE WITH SWIVELING NOZZLE ASSEMBLY

[75] Inventor: Kazuyoshi Miyano, Yokohama, Japan

[73] Assignee: Inoue-Japax Research Incorporated, Yokohama, Japan

[21] Appl. No.: 785,841

[22] Filed: Oct. 9, 1985

[51] Int. Cl.⁴ .......................... B23H 7/02; B23H 7/36
[52] U.S. Cl. .................................. 219/69 W; 204/206; 204/224 M; 219/69 D
[58] Field of Search .......................... 219/69 D, 69 W; 204/206, 224 M

[56] References Cited

U.S. PATENT DOCUMENTS

| | | | |
|---|---|---|---|
| 4,123,645 | 10/1978 | Shichida et al. | 219/69 W |
| 4,481,095 | 11/1984 | Inoue | 219/69 W |
| 4,507,532 | 3/1985 | Inoue | 219/69 W |
| 4,513,192 | 4/1985 | Inoue | 219/69 D |
| 4,575,603 | 3/1986 | Inoue et al. | 219/69 W |
| 4,608,143 | 8/1986 | Inoue | 219/69 W |

FOREIGN PATENT DOCUMENTS

| | | | |
|---|---|---|---|
| 0142034 | 10/1984 | European Pat. Off. | |
| 2527117 | 11/1983 | France . | |
| 53-84296 | 7/1978 | Japan | 219/69 W |
| 202729 | 11/1983 | Japan | 219/69 D |
| 59-30625 | 2/1984 | Japan | 219/69 D |
| 59-30626 | 2/1984 | Japan | 219/69 D |
| 59-88221 | 5/1984 | Japan | 219/69 W |
| 175927 | 10/1984 | Japan | 219/69 D |

*Primary Examiner*—A. D. Pellinen
*Assistant Examiner*—Geoffrey S. Evans
*Attorney, Agent, or Firm*—Karl F. Ross; Herbert Dubno

[57] ABSTRACT

A traveling-wire electroerosion machine with nozzle assemblies on each side of the workpiece, has at least one of these nozzle assemblies formed with a rotatable outlet member with a caster-like formation engaging the workpiece surface to orient an inclined machining liquid orifice against the back of the wire electrode and in the direction of the machining front at an inclination to the linear wire travel path through the workpiece.

19 Claims, 4 Drawing Figures

TRAVELING-WIRE ELECTROEROSION MACHINE WITH SWIVELING NOZZLE ASSEMBLY

FIELD OF THE INVENTION

My present invention relates to a traveling-wire electroerosion machine having a swiveling nozzle assembly and, more particularly, to a machine for the traveling-wire electrical discharge and/or electric chemical machining of a workpiece in which at least one nozzle assembly can swivel about an axis offset from the wire path and is provided with a guidepath for the machining liquid which trains the machining liquid at an angle to this path.

BACKGROUND OF THE INVENTION

Traveling-wire electroerosion machines, frequently abreviated TW-EDM machines (in the case of electric discharge machining), are machine tools in which an elongated electrode is displaced substantially continuously along a generally rectilinear path along the length of the machining stretch of the electrode between a pair of wire guides from an electrode supply system to an electrode takeup system.

The term "electroerosion" is used generically to describe electrical machining using such an electrode and a machining liquid which is introduced into the region at which the electrode is juxtaposed with the workpiece, inter alia to sweep the machining zone free from machining detritus, i.e. material removed from the conductive workpiece.

In EDM, the machine liquid is generally a dielectric e.g. wire of low conductivity and the machining is effected by impressing discharge electrical pulses across the electrode and the workpiece so that discharges develop in the gap between the workpiece and the electrode to remove material at least preferentially from the workpiece.

There are other types of electroerosion which utilize, for example, electrochemical solubilization of workpiece material (ECM) or a combination of electrochemical and discharge machining (ECDM) in which the liquid can have a more conductive character.

In practically all cases, the electrical energy utilized in the machining process is supplied to the machining zone in the form of discrete electrical pulses.

The term "wire" is used herein to describe the machining electrode and should also be understood to encompass elongated members generally and thus wires of various cross-sectional configurations as well as tapes, ribbons or the like. The electrode, of course, should be conductive and the thickness of the electrode should be between 0.05 mm and 0.5 mm.

In the published Europatent application No. 0 142 034, corresponding to European patent application No. 84 11 22 10.4 filed Oct. 11, 1984 and published May 22, 1985, there is described a traveling-wire electro-erosion machine with double-floating nozzle assemblies.

The floating-nozzle assembly can serve to deliver the machining liquid to the machining zone and can be traversed by the machining electrode or wire and in that system, the flow of the machining liquid is axial, i.e. parallel to the axial travel of the tool electrode.

The floating fluid-delivery nozzles of that system are axially movable so that, for example, they may be urged toward engagement with the workpiece to constrict the zone at which the liquid may flow away from the face with which this nozzle is juxtaposed.

OBJECTS OF THE INVENTION

It is the principal object of my present invention to improve upon the traveling-wire electroerosion machine described in the aforementioned publication and, more specifically, improve the accuracy and stability of the machining operation.

Another object of my invention is to provide a TW-EDM, or TW-ECM or TW-ECDM machine having improved accuracy and, specifically, closer adherence to the programmed machining path in a workpiece.

It is also an object of my invention to improve the machining stability in a TW-electroerosion machine and process so that unstable machining conditions are less likely to develop.

SUMMARY OF THE INVENTION

I have now discovered that, when a nozzle through which a traveling-wire electroerosion electrode passes is biased floatingly against a surface of the workpiece and is formed with a sole discharge passage for the machining liquid which is inclined in the direction in which the electrode is fed into or out of the workpiece during the machining operation, there is a significantly enhanced stability of the machining operation, with improved precision and less tendency toward destabilization of the machining operation even where relatively large workpiece thicknesses are subject to be encountered.

Specifically, I provide means in conjunction with such a nozzle for continuously reorienting the nozzle to maintain the aforementioned passage so that it is directed in the electrode-feed direction and specifically against the surfaces of the electrode which are turned away from the machining front of the workpiece.

For a complete understanding of the invention, some definition may be in order.

In a traveling-wire electroerosion machine, the path of the cut in the workpiece in a direction substantially perpendicular to the direction of movement of the electrode along its travel path, is customarily determined by a program controlled by a numerical controller or other computer which can be connected to an X-Y table upon which the workpiece is mounted. Of course, the head through which the electrode passes may be provided with an X-Y controller to determine this path, if desired, as an alternative, or in addition. The latter X-Y controller may be used to controlledly incline the electrode wire with a constant angle or varying angles relative to the workpiece surfaces so that a tapered or three-dimensional cut contour may develop in the workpiece.

In the more common construction, the workpiece is fed into this electrode path and, as a result, a cut is formed in the workpiece so that it can be said that a cutting path is formed through the workpiece which is the path of the wire in the workpiece. Thus, there is a relative displacement of the workpiece and the electrode in a direction perpendicular or transverse to the travel direction of the wire.

A portion of the traveling wire will confront workpiece material over the thickness of the workpiece in the region at which this material is to be eroded. This zone of the workpiece at the leading end of the kerf or machining slot formed by the wire is the machining front and, depending upon the direction in which the machining front is oriented with respect to the axis of the wire, the traveling-wire electrode will be considered to have a machining face juxtaposed with the machining front and, in most electroerosion operations, the apparatus will be provided with control means for maintaining the gap between the machining face and the machining front substantially constant.

According to the present invention, the nozzle is mounted on its support so that it can swivel about an axis parallel to the axis of the wire and preferably coinciding with the axis of the wire so that the passage which is inclined to this axis is always directed substantially toward the machining front and follows the machining operation so as to be so directed and to train the outflow from this passage, i.e. the machining liquid at an inclination of the wire, but always toward the machining front.

Swivel means, preferably in the form of at least one ball, acting like a caster, and which is offset from this axis, can engage the workpiece and preferably can ride in the kerf or slot to ensure that the passage will always be trained against the machining front and into the machining zone.

To allow free rotation of the nozzle so that it can swivel in the manner described, the nozzle is preferably mounted by bearings in its support and where it is resiliently mounted in a floating manner, any mounting springs can act upon the nozzle via thrust bearings or the like.

According to a feature of the invention, the nozzle structure formed with this passage is rotatably mounted on a tubular structure through which the liquid is guided around a central sleeve traversed by the wire so that this directing member, formed with the inclined passage, can ensure the inclined flow of the machining liquid rather than an axial flow as is the case, for example, in the aforementioned Euro patent application.

Preferably the angle inclined between the axis of the passage and the axis of the wire in the direction of flow of the liquid can be between 5° and 45° and most preferably between 10° and 40°.

The caster ball which is preferably used can be spring-loaded against the workpiece or can be composed of an elastomeric or elastic material and the nozzles above and below the workpiece can both be provided as swiveling members although at least the nozzle from which the wire emerges should be provided with such a swiveling member having an inclined discharge passage.

According to the invention, therefore, the electroerosion machine can comprise a pair of fluid-delivery assemblies disposed at opposite sides of a conductive workpiece and adapted to define a straight-line travel path thereacross for a continuous machining electrode, also referred to as a traveling wire or wire-like electrode, and to discharge a machining fluid medium along the electrode into a cutting zone in the workpiece.

The machine also will include drive means for effecting relative displacement between the assemblies and the workpiece along a predetermined feedpath to form a corresponding contour in the workpiece.

At least one of these assemblies can comprise a hollow base member formed with an inner fluid passage around the electrode for receiving the machining fluid through fluid-inlet means, and a fluid-outlet member supported by the base member and rotatable about the electrode travel path. This outlet member is formed with a fluid discharge orifice traversed by the electrode and communicating with the fluid passage of the base member.

The axis of the discharge orifice is inclined at the aforementioned angle to the wire travel path and means are provided to rotate the fluid outlet member to position the discharge orifice adjacent the cutting zone so that it directs its outflow against the aforementioned cutting front or behind the electrode with respect to the direction in which the electrode advances through the workpiece to form the contour. Means can also be provided to urge the outlet member against the corresponding face of the workpiece with which the respective assembly is juxtaposed.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
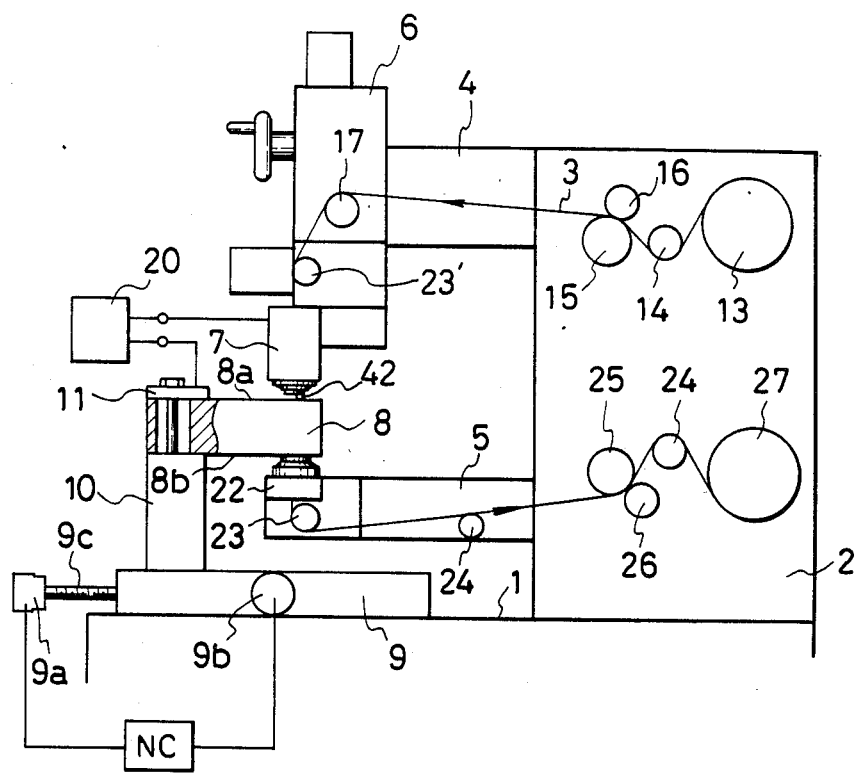
FIG. 1 is a diagrammatic side elevational view of an electroerosion machine illustrating principles of the present invention.

In FIG. 1 of the drawing I have shown an electroerosion machine, for example a TW-EDM machine, for machining a cantilevered workpiece 8 which is connected by a bolt clamp 11 and a support post 10 to a worktable 9 capable of being driven incrementally in two mutually perpendicular directions by motors 9a and 9b and respective lead screws, one of which has been shown at 9c in FIG. 1, the motors being controlled by an NC (numerical control) unit representing any computer or programmable unit capable of generating the desired cut contour in the workpiece.

The tool post is represented at 2 and rises from a base 1 upon which the table 9 is movably mounted in the manner described and carries, as has been shown highly diagrammatically, a supply spool 13 of the traveling-wire electrode 3 which passes a tensioning roller 14 and between a pair of driven pinch rollers 15, 16 whose drive can be coupled to the drive of a pair of pinch rollers 25, 26 at the takeup side to maintain a predetermined tension in the wire.

A linear stretch of the traveling wire is established between a pair of guide rollers 23, 23' and a wire is deflected into this linear stretch by a deflection roller 17.

Figure 2:
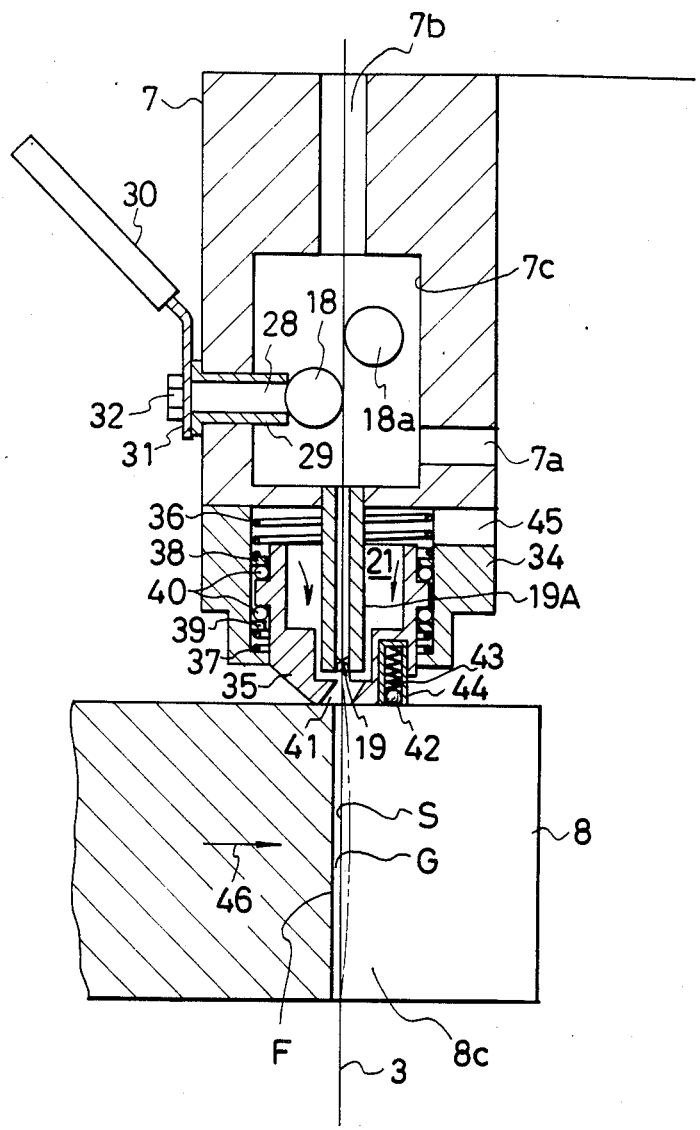
FIG. 2 is a detail cross section of one of the nozzle assemblies in accordance with one embodiment of the invention.
Figure 3:
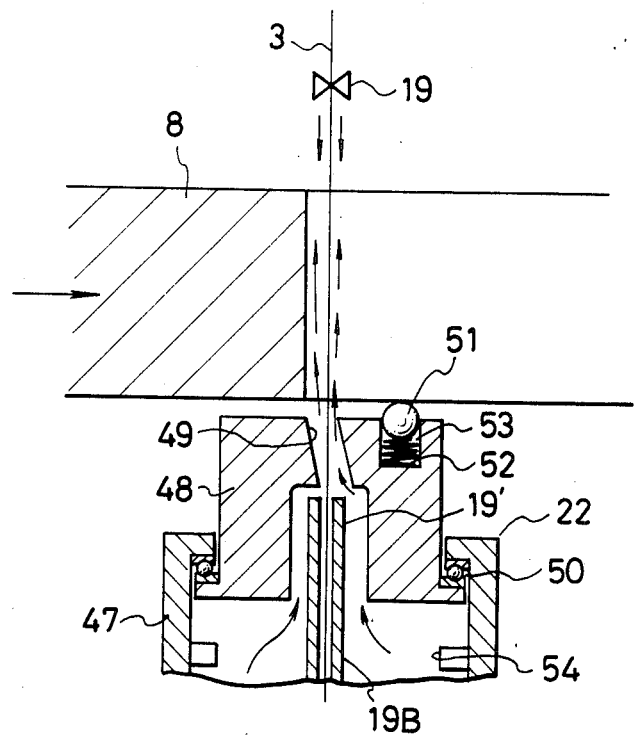
FIG. 3 is an axial section illustrating another nozzle assembly in accordance with the principles of this invention.
Figure 4:
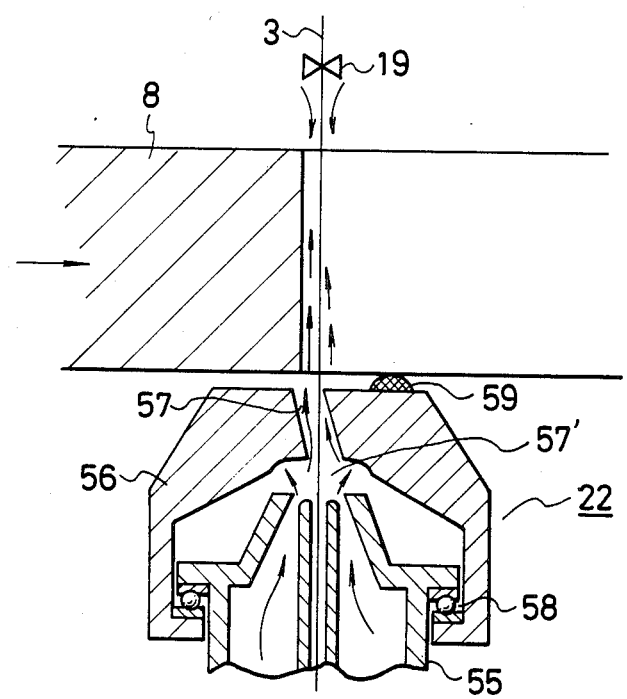
FIG. 4 is still another axial section showing an assembly for discharging machine fluid for a machine as shown in FIG. 1.

Over its linear stretch, the wire passes through a pair of nozzle assemblies straddling the workpiece and represented at 7 and 22, respectively, at least one of these nozzle assemblies being provided with the swivel means illustrated in FIG. 2 although preferably both nozzle assemblies are provided with such swivel means (the upper nozzle assembly corresponding to FIG. 2 while the lower nozzle assembly corresponds to the structure of FIGS. 3 or 4).

The principles described in the aforementioned Euro-patent application, for urging at least the outlet member of each nozzle assembly in the direction of the workpiece surfaces 8a and 8b will, of course, also be used. A roller 24 can serve to measure the utilization of the wire electrode and can be used as a control for the rate of feed thereof in the wire travel direction which is downwardly in FIG. 1.

Referring now to FIG. 2, it can be seen that the wire 3 passes through the workpiece 8 and forms a cut therein which is in the form of a slot 8c lying behind the wire. The workpiece is fed in the direction 46 which is perpendicular to the wire travel direction as previously described and, because of the kinetic energy of the machining operation released in the gap G between the machining front F and the machining surface S of the wire, there is a tendency for the wire to bend away from the machining front as shown in dot-dash lines and hence for the gap width to be changed.

At least part of the increased accuracy of the machining operation is obtained, in accordance with the invention, by counteracting the forces acting upond the wire away from the machining front F with hydrodynamic and hydrostatic forces in this direction by training the flow of the liquid medium against the wire in the direction of the machining front, i.e. opposite to the arrow 46, at least with a component of the velocity of flow of this liquid medium.

In the construction shown in FIG. 2, the upper nozzle assembly 7 comprises a hollow base member which is formed with a passage 7b through which the wire 3 passes into a chamber 7c supplied, if desired with compressed air or some other fluid preventing backflow of the machining liquid into this chamber through the wire guide opening 19 of the tube 19a traversed by the wire 3.

The chamber 7c receives a pair of rollers 18 and 18a which position the wire, the roller 18 being engaged by a brush 28 in an electrically insulating sleeve 29 fitted into the base member 7. A bolt 32 clamps a lug 31 of a supply conductor 30 from the EDM power supply to the brush 28. The other conductor from this power supply is affixed to the clamp 11 and hence completes the electrical circuit through the workpiece.

The fluid outlet member in this nozzle is represented at 35 and is formed with an inclined outlet passage 41 communicating via a chamber 21 with an inlet 45 in the hollow base member and constituting fluid inlet means for the latter.

A coil spring 36 is braced against the base 7 and bears upon a washer 38 engaging a thrust bearing 40 lying on one side of an annular flange of the outlet member 35. Another thrust bearing 40 on the lower side of this flange is supported on another spring 37 so that in effect the outlet member 35 floats vertically while being biased by the dielectric fluid medium downwardly against the workpiece and being free to rotate within the base member 7.

To ensure that the passage 41 will always be trained against the machining front F and thus direct its stream of liquid against the traveling wire at an inclination with a force component in this direction, a caster ball 42 is provided eccentrically with respect to the axis of rotation of the member 35, bears upon the upper surface of the workpiece and preferably rides in the slot machined therein and is resiliently supported by a coil spring 43 in the axial direction. Naturally the diameter of the ball 42 should be greater than the width of the slot or kerf machined in the workpiece.

As can be seen from FIG. 2, therefore, during the machining operation which requires no specific description, the machining liquid does not flow directly axially along the wire but rather is always directed from behind against the wire and braces the wire hydraulically in the direction of the machining front F to prevent oscillation of the wire during machining operations even for large thickness workpieces and thereby improve the machining accuracy.

In FIG. 3 the lower nozzle assembly 22 is shown and can be seen to comprise a base member 47 into which the liquid medium is fed through an inlet which has not been illustrated. A thrust bearing 50 rotatably supports the outlet member against the base member 47 and, of course, a spring suspension can be provided here as well, or some other floating arrangement can be utilized. The member 48 surrounds the tube 19b through which the wire is fed as does the outlet member 35 of FIG. 2 and is formed with an inclined passage 49 training the liquid not strictly axially along the wire but always in the direction of the machining front as is clearly apparent from FIG. 3. The upper nozzle asssembly has not been illustrated here but only the obstruction 19 against reverse flow of the liquid has been indicated by reference numeral. A diaphragm can be used for this purpose although compressed air is preferred as the reverse flow blocking medium. A similar blockage of reverse flow through the tube 19B can be ensured as well.

The caster roller is here formed by the ball 51 which is biased by a spring 53 against the lower surface of the workpiece within the recess 52 in the outlet member 48. The axial passage of tube 19B has been represented at 19' in FIG. 3.

FIG. 4 shows another lower nozzle assembly 122 in which the outlet member 56 has the inclined passage 57 and a caster ball 59 in the manner previously described, and is free to rotate via a thrust bearing 58 on the liquid supply member 55 through which the tube 19B extends.

In this embodiment, the outlet from member 55 narrows before opening into the chamber 57' which is upstream of the inclined passage 57. Here again the outlet member swivels to follow the progress of the cut, keeping the liquid outflow always directed against the side of the wire turned away from the machining front F.

I claim:

1. In an electroerosion machine in which an elongate electrode is displaced in an electrode traveling direction along a substantially linear machining stretch between guides on opposite sides of a workpiece and a machining front of the workpiece is spacedly juxtaposed with the electrode over said stretch across a machining gap into which a machining liquid is introduced from at least one nozzle assembly on a respective side of said workpiece and juxtaposed with a respective surface thereof whereby said electrode passes through said nozzle assembly, and said workpiece and said electrode are relatively displaced to advance said machining front through said workpiece along a predetermined cut contour, the improvement wherein said nozzle assembly comprises:

a base member formed with an inlet for said liquid;
an outlet member rotatably mounted on said base member about a rotation axis generally coinciding with said stretch and provided with a sole fluid emitting outlet orifice having an annular wall directly surrounding said electrode and centered on an axis inclined to said rotation axis and said electrode and oriented to train a stream of said liquid onto said electrode from behind in a direction of advance of said electrode along said contour and inclined to said machining stretch; and means riding on said surface offset from the axis for orienting said outlet member rotatably so that said stream is continuously trained upon said machining front and into said gap as said machining contour is formed in said workpiece.

2. The improvement defined in claim 1 wherein said means riding on said one of said surfaces includes a roller mounted in said outlet member, engaging said one of said surfaces, and offset from said rotation axis.

3. The improvement defined in claim 2 wherein said roller is positioned and dimensioned to engage partly in said cut.

4. The improvement defined in claim 2, further comprising means resiliently mounting said roller in said outlet member.

5. The improvement defined in claim 2, further comprising a thrust bearing interposed between said base member and said outlet member.

6. The improvement defined in claim 2 wherein said roller is a ball.

7. The improvement defined in claim 2 wherein said guides include a tube traversed by said electrode and extending into said outlet member but terminating with spacing from said passage.

8. The improvement defined in claim 2 wherein said axis of said outlet orifice is inclined at an angle of substantially of 5° to 45° to the rotation axis.

9. The improvement defined in claim 1 wherein a further nozzle assembly is provided on an opposite side of said workpiece and is juxtaposed with a respective surface thereof for also introducing machining liquid into said gap, said electrode passing through said further nozzle assembly.

10. The improvement defined in claim 9 wherein said further nozzle assembly also is provided with a passage inclined to said stretch and with means riding on the respective surface for orienting the respective passage so that a respective stream of said liquid is continuously trained upon said machining front as said machining contour is formed in said workpiece.

11. The improvement defined in claim 10 wherein said further nozzle assembly has an outlet member formed with said passage rotatably mounted on a bases member provided with an inlet for said liquid.

12. The improvement defined in claim 11, further comprising means for floatingly mounting at least one of said outlet members to support the same against the respective surface of said workpiece.

13. An electroerosion machine comprising:

a pair of fluid delivery assemblies disposed at opposite sides of a conductive workpiece and adapted to define a straight-line travel path thereacross for a traveling wire-like electrode and to discharge a machining fluid medium along said electrode into a cutting zone in the workpiece; and drive means for effecting relative displacement between said assemblies and the workpiece along a predetermined feed path to form a corresponding contour in the workpiece, at least one of said assemblies comprising:

a hollow base member formed with an inner fluid passage about the electrode for receiving the machining fluid through fluid inlet means; and a fluid outlet member supported by said base member rotatably about said travel path and formed with a sole fluid discharge orifice directly surrounding the electrode and communicating said fluid passage, said discharge orifice having an annular wall centered on an axis inclined at a predetermined angle to said travel path, said base member being positionable to bring said discharge orifice adjacent said cutting zone, said outlet member having projecting means engageable with said workpiece for continuously orienting said orifice to train a stream of said machining fluid at an angle against said electrode from behind with respect to a direction of travel of said electrode along said path and in the direction of a cutting front formed by machining of said workpiece with said electrode.

14. The electroerosion machine defined in claim 13 wherein said projecting means includes a caster ball adapted to ride along a surface of said workpiece.

15. The electroerosion machine defined in claim 14, further comprising spring means in said outlet member resiliently biasing said ball against said surface.

16. The electroerosion machine defined in claim 15 wherein each of said assemblies is formed with a respective base member and outlet member surrounding said electrode.

17. The electroerosion machine defined in claim 15, further comprising a thrust bearing rotatably supporting said outlet member on said base member.

18. The electroerosion machine defined in claim 17, further comprising spring means floatingly supporting said outlet member on said base member in an axial direction.

19. The electroerosion machine defined in claim 18 wherein said angle is between substantially 5° and 45°.

* * * * *